US006625264B1

United States Patent
Ahrndt

(10) Patent No.: US 6,625,264 B1
(45) Date of Patent: Sep. 23, 2003

(54) METHOD FOR DIALING UP A DATA NETWORK TERMINAL AS WELL AS SWITCHING SYSTEM WITH APPERTAINING SUBSCRIBER TERMINALS

(75) Inventor: Thomas Ahrndt, Munich (DE)

(73) Assignee: Siemens Aktiengesellschaft, Munich (DE)

(*) Notice: Subject to any disclaimer, the term of this patent is extended or adjusted under 35 U.S.C. 154(b) by 214 days.

(21) Appl. No.: 09/672,615

(22) Filed: Sep. 29, 2000

(30) Foreign Application Priority Data

Sep. 29, 1999 (DE) .......................... 199 46 661

(51) Int. Cl.⁷ .............................................. H04M 11/00
(52) U.S. Cl. ................... 379/93.32; 379/90.01; 379/201.01
(58) Field of Search ..................... 379/93.01, 93.02, 379/93.05, 93.06, 93.07, 93.08, 93.09, 93.32, 93.28, 93.29, 100.12, 100.13, 100.14, 100.15, 355.01, 201.01, 900; 370/352, 353, 354

(56) References Cited

U.S. PATENT DOCUMENTS 6,035,020 A * 3/2000 Weinstein et al. ....... 379/93.09

* cited by examiner

Primary Examiner—Melur Ramakrishnaiah
(74) Attorney, Agent, or Firm—Morrison & Foerster LLP

(57) ABSTRACT

In order to produce an accelerated connection between a subscriber terminal (1, 2) and a data network terminal (15) given a traditional switching system (3) and in order to avoid an uneconomical system load, it is provided that the subscriber terminal (1, 2) generates a special dial signal for dialing into the data network terminal (15). The switching system (3) must be fashioned in this case such that it recognizes the special dial signal and, upon its arrival, immediately initiates a forwarding to the data terminal network terminal (15).

7 Claims, 2 Drawing Sheets

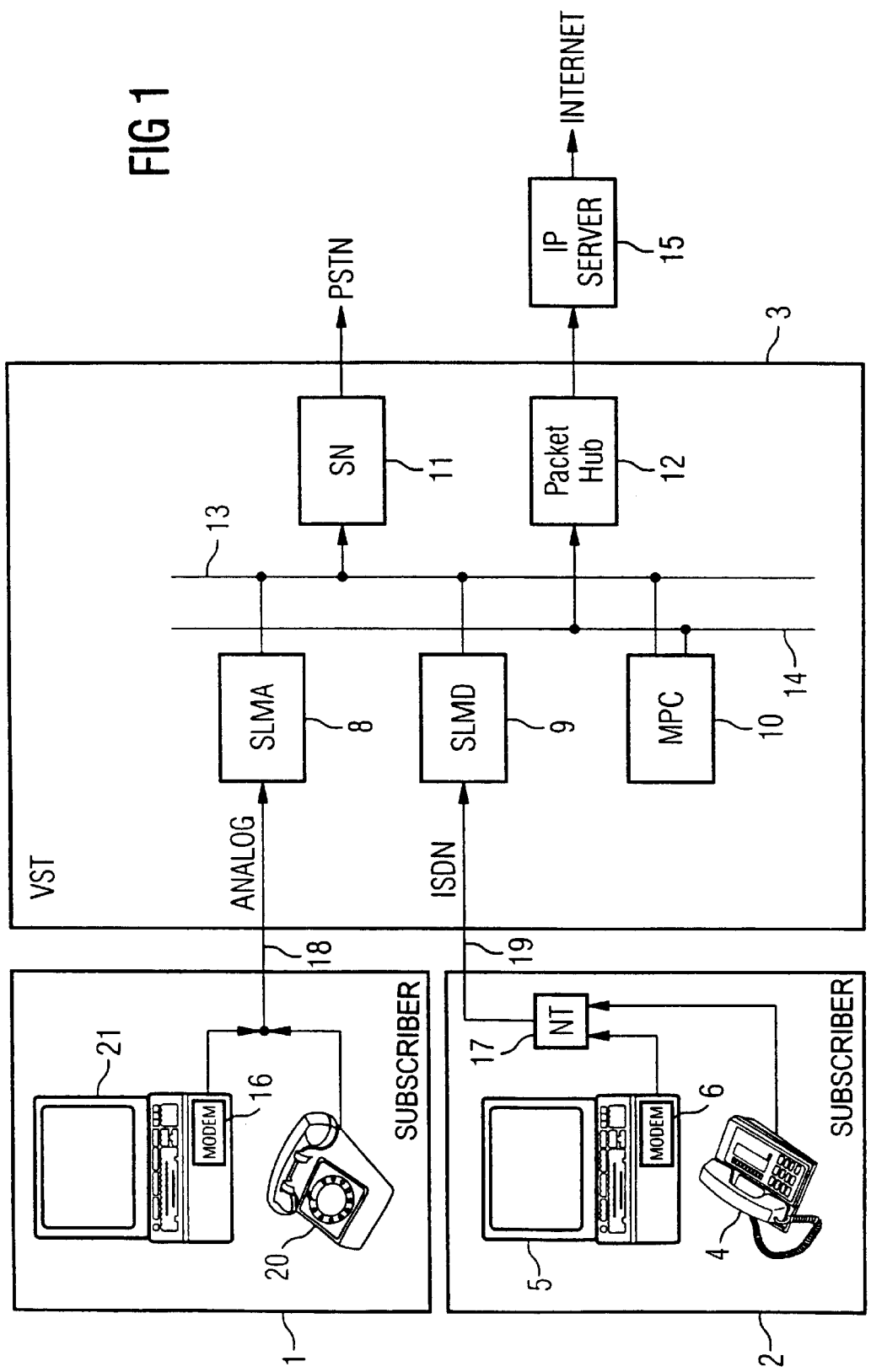

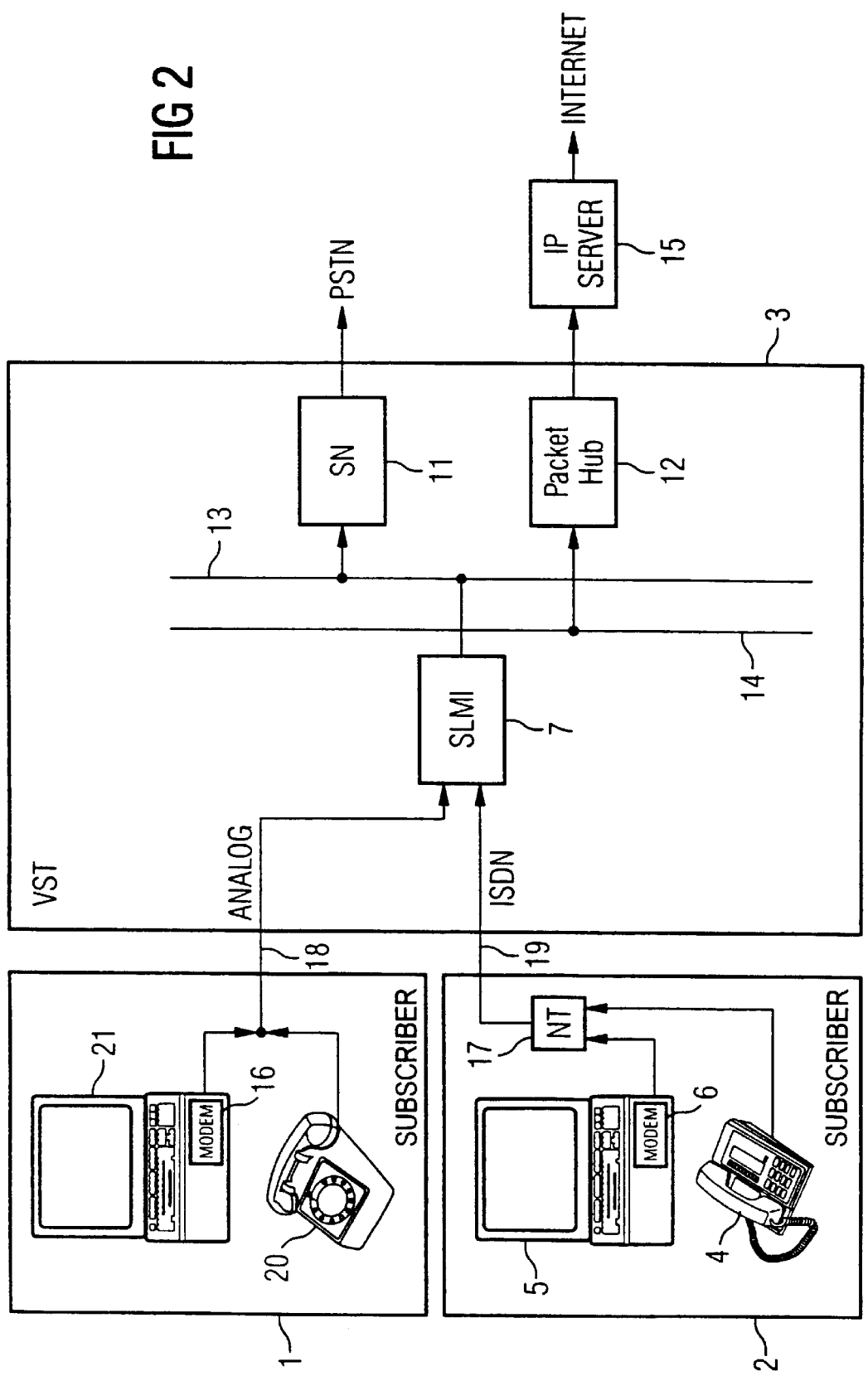

METHOD FOR DIALING UP A DATA NETWORK TERMINAL AS WELL AS SWITCHING SYSTEM WITH APPERTAINING SUBSCRIBER TERMINALS

CLAIM FOR PRIORITY

This application claims priority to Application No. 19946661.0 which was filed in the German language on Sep. 29, 1999.

TECHNICAL FIELD OF THE INVENTION

The invention is directed to a method for dialing up a data network terminal from a subscriber terminal via a switching system that works with numeral dial signals representing dial numbers.

BACKGROUND OF THE INVENTION

The subscriber of a telephone network connected to a switching system can usually reach another subscriber in that a corresponding number usually composed of a plurality of numerals is dialed at the telephone. The individual numerals of the multi-place number lie between 0 and 9. For older analog telephones, the subscriber repeatedly actuates a rotary dial for this purpose, which then successively outputs a plurality of pulses corresponding to the individual digits to the switching system (dial pulsing IWF). For pushbutton telephones with an analog connection, the subscriber successively presses the buttons corresponding to the numerals. The telephone set then successively outputs combinations of defined audio frequencies to the switching center (dual tone multi-frequency signalling MFV).

In addition to the these telephone dial signals, there is currently also the possibility of connecting a PC located at the subscriber to a data network terminal, for example, to an Internet server. To that end, the PC automatically dials the number of the data network terminal. For example, the Internet server of Deutsche Telecom (T-online) has the number 0191011. When the connection has been set up, the modem of the PC sends the data signals in the form of modulated audio frequencies.

The public switching system is usually composed of a plurality of successively connected switching centers with electronic switches. The electronic switches process the numeral dial signals in sequence. The connection is set up only after the last digit has been interpreted. Only then are the voice signals and the data signals as well transmitted from the subscriber to the dialed, other subscriber terminal or to the data network terminal. Moreover, the current system connection is set up at every dialed numeral; this, however, must in turn be cleared down for dialing into the Internet if an IP server is resident in the switching center (see FIG. 1).

This latter situation, is considered disadvantageous with respect to the data network connection, due to the associated delay, on the one hand, and due to the uneconomical system load, on the other hand.

SUMMARY OF THE INVENTION

The invention provides a method such that employment of a data service operates faster than prior methods of processing numeral dial signals of a multi-place number for the data service to be dialed, and such that the system load is reduced.

In one embodiment of the invention, a solution is provided by a method for dialing into a data network terminal from a subscriber terminal via a switching system that works with numeral dial signals representing dial numerals. The method includes, for example, generating, by the subscriber terminal, a special dial signal for dialing into the data network terminal, the special dial signal differing from the numeral dial signals; recognizing, by the switching system, the special dial signal; and initiating, by the switching system, upon arrival of the special dial signal, a forwarding to the data network terminal regardless of an interpretation of the numeral dial signals.

Generating the special dial signal may comprise forming the special dial signal at a newly defined audio frequency that has not previously been used for the numeral dial signals, and may further comprise forming the numeral dial signals by different, defined audio frequencies.

Another embodiment includes, for example, forming the numeral dial numeral dial signals by different combinations of defined audio frequencies; wherein generating a special dial signal further comprises forming the special dial signal by a new combination of previously defined audio frequencies, the new combination not having been employed for forming the numeral dial signals.

Generating the special dial signal comprises forming the special dial signal by a previously employed, defined audio frequency with a newly defined modulation, and may further comprise utilizing defined audio frequencies with defined modulation for transmitting digital data.

The audio frequencies may be newly defined for the special dial signals and lie outside of the voice band.

In another embodiment, the invention may also be implemented with a switching system for connecting appertaining subscriber terminals to a data network terminal, as well as appertaining subscriber terminals, comprising a generator at each subscriber terminal for generating a special dial signal for dialing into the data network terminal; a switching system; a switch provided in the switching system configured to recognize the special dial signal and that, given identification of a signal as being the special dial signal, to produce a connection between a dialing the subscriber terminal and the data network terminal.

Just like the inventive method, the inventive switching system should assure that the connection between subscriber and data network can be set up faster than previously. The system load is also reduced.

BRIEF DESCRIPTION OF THE DRAWINGS

Exemplary embodiments of the invention are described below on the basis of the drawings, where:

FIG. 1 shows a part of a traditional public switching system with subscriber terminal and data network terminal.

FIG. 2 shows part of a traditional public switching system which is designed in accordance with the invention.

DETAILED DESCRIPTION OF THE PREFERRED EMBODIMENTS

A subscriber terminal 1 in both examples includes an analog telephone 20 with rotary dial or pushbuttons. The numerals of the dialed number are successively transmitted according to dial pulsing (IWF) or according to the dual tone multi-frequency signaling (MFV) for setting up a connection.

The subscriber terminal 1 also includes a PC 21 with a modem 16. When the subscriber with the PC 21 wishes to dial up a data network terminal, for example the IP server 15 for the Internet, then the modem in turn dial a number including several digits that is allocated to the IP server 15. When, for example, it is a matter of the server T-online of Deutsche Telekom, then the number 0191011 is dialed. After setup of the connection to the IP server 15, the modem 16 transmits data signals in the form of modulated audio frequency combinations. The latter are likewise supplied to the analog transmission line 18.

A further subscriber tenninal2 includes an ISDN telephone 4. To enable the subscriber to enter into communication via the ISDN telephone 4 with another subscriber, the subscriber successively presses keys that correspond to the number to be dialed that is composed of a plurality of digits.

The further subscriber terminal 2 also includes a PC 5 with a modem 6. The dial information generated by the modem 6 are likewise supplied to the ISDN line 19 via the network termination unit NT17.

The public switching system 1 in both examples is represented by a switching center (VST) 3; a plurality of such switching centers 3 are usually networked with one another.

The switching center 3 shown in FIG. 1 comprises five modules 8–12 and two bus lines 13 and 14. The module 8 (analog line card) includes the labeling SLMA (subscriber line module analog) and is connected at the input side to be analog transmission line 18.

The module 9 (ISDN line card) carries the designation SLMD (subscriber line module digital) and is connected at the input side to the ISDN line 19.

The module 8 and the module 9 successively process the numeral dial pulses. At the end of each digit, information is forwarded to following switching units that then immediately initiate a corresponding connection setup. Whether or not a dialing into the Internet is to take place is certain after all digits have been processed.

The module 10 carries the designation MPC (module pool card). This module is connected to the two bus lines 13 and 14. It converts time slot-oriented information into a packet-oriented data stream and vice versa.

The module 11, which is labeled SN (switching network), is also connected to the bus 13. This module forwards the numeral dial signals and the voice signals to a PSTN network (public switched telephone network), so that the connection to the dialed, other subscriber terminal can be ultimately produced.

The module 12 is labeled PACKET HUB. It forms an interface that converts the packet-oriented data stream coming from the bus 14 into another packet-oriented data stream that corresponds to the standards required of HP servers.

In order to produce the connection between the subscriber terminals 1 or 2 and the data network terminal 15 in accelerated fashion, the following modifications are undertaken in the system shown in FIG. 1, which are not graphically shown since they are essentially a matter of procedural measures.

The PC 5 or, respectively, the PC 21 generates a special dial signal that is recognized in the switching center 3. Upon recognition of such a special signal, the module 10 through-connects. This means that the PC 5 or PC 21 is connected to the EP server 15 without having to process a number including several digits that, with reference to the plurality of digits, fits into the number system for the public subscriber terminals.

The simplest possibility for realizing this fundamental idea is that the subscriber downloads a combination of audio frequencies previously used for the numeral dial signals in a new combination from the Internet and stores this combination. The corresponding, software-oriented modification at the module 10 can be undertaken on the part of the switching center.

Another possibility is that audio frequencies previously not yet employed are used outside or inside the voice band for the special dial signal. It is also possible that previously defined audio frequencies are employed for the special dial signal with a new, defined modulation. Corresponding modifications would then also be undertaken in the module 10.

FIG. 2 differs from FIG. 1 in that the modules 8, 9 and 10 are replaced by a single module 7 that is referenced SLMI (subscriber line module Internet). The module 7 is connected at the input side both to the analog transmission line 18 as well as to the ISDN line 19. At the output side, further, it is connected both to the bus 14 as well as to the bus 13. This means that the module 7 can process both analog signals as well as ISDN signals. And this also means that the module 7 can co-assume the function of the module 10 in FIG. 1. The modifications for realizing the proposed invention are therefore undertaken at the module 7 in FIG. 2.

The new signals or signal combinations employed for the special dial signal differ from the previously employed and defined numeral dial signal and from the digital signal that are normally generated and output by a module.

Since the number of data network terminals relevant for a subscriber at a public switching system is usually far smaller (usually only 1) than the number of other subscribers to be dialed, the creation of a special dial system is justified and causes insubstantial interventions into the previous switching systems.

The above-described method and system are illustrative of the principles of the present invention. Numerous modifications and adaptations thereof will be readily apparent to those skilled in this art without departing from the spirit and scope of the present invention.

What is claimed is:

1. A method for dialing into a data network terminal from a subscriber terminal via a switching system using numeral dial signals representing dial numerals, comprising:

generating, by said subscriber terminal, a special dial signal for dialing into said data network terminal, said special dial signal has not previously been used for numeral dial signals;

recognizing, by said switching system, said special dial signal; and initiating, by said switching system, upon arrival of said special dial signal, a forwarding to said data network terminal regardless of an interpretation of said numeral dial signals, wherein said generating said special dial signal comprises forming said special dial signal at a newly defined audio frequency that has not previously been used for said numeral dial signals.

2. A method according to claim 1, further comprising:

forming said numeral dial numeral dial signals by different combinations of defined audio frequencies;

wherein said generating a special dial signal further comprises forming said special dial signal by a new combination of previously defined audio frequencies, said new combination not having been employed for forming said numeral dial signals.

3. A method according to claim 1, wherein said generating said special dial signal comprises forming said special dial signal by a previously employed, defined audio frequency with a newly defined modulation.

4. A method according to claim 3, further comprising utilizing defined audio frequencies with defined modulation for transmitting digital data.

5. A method according to claim 1, wherein said audio frequencies to be newly defined for said special dial signal lie outside of the voice band.

6. A method according to claim 1, further comprising forming said numeral dial signals different, defined audio frequencies.

7. A switching system for connecting appertaining subscriber terminals to a data network terminal, comprising:

a generator at each subscriber terminal for generating a special dial signal for dialing into said data network terminal, wherein said special dial signal has not previously been used for dial signals;

a switching system; and a switch provided in said switching system configured to recognize said special dial signal and, when identifying a signal as being said special dial signal, producing a connection between a dialed, or subscriber terminal and said data network terminal, wherein said generating said special dial signal comprises forming said special dial signal at a newly defined audio frequency that has not previously been used for said numeral dial signals.

* * * * *